United States Patent [19]
Van Wageningen et al.

[11] Patent Number: 5,784,684
[45] Date of Patent: Jul. 21, 1998

[54] COMMUNICATION NETWORK

[75] Inventors: Andries Van Wageningen; Marinus Bakker, both of Wijlre, Netherlands

[73] Assignee: U.S. Philips Corporation, New York, N.Y.

[21] Appl. No.: 544,797

[22] Filed: Oct. 18, 1995

[30]  Foreign Application Priority Data

Oct. 18, 1994 [EP] European Pat. Off. ............. 94203009

[51] Int. Cl.$^6$ ............................. H04B 1/60; H04B 17/02
[52] U.S. Cl. .................... 455/9; 455/8; 455/13.1
[58] Field of Search ................. 455/9, 11.1, 13.1, 455/13.4, 14, 3.3, 8, 67.1, 127, 343, 41; 379/58; 340/291, 425.2, 425.1, 310.01, 310.06

[56]  References Cited

U.S. PATENT DOCUMENTS

| | | | |
|---|---|---|---|
| 2,699,495 | 1/1955 | Magnuski et al. | 455/8 |
| 5,070,500 | 12/1991 | Horinouchi et al. | 455/41 |
| 5,551,056 | 8/1996 | Koponen et al. | 455/9 |

FOREIGN PATENT DOCUMENTS

4306186A1  9/1994  Germany .............. H04L 12/28

*Primary Examiner*—Reinhard J. Eisenzopf
*Assistant Examiner*—Marsha D. Banks-Harold
*Attorney, Agent, or Firm*—Leroy Eason

[57]  ABSTRACT

A communication network comprises a transceiver arranged for passing on signals, coming in via an incoming signal path, to an outgoing signal path. The transceiver is coupled by the incoming signal path to a first neighboring transceiver and by the outgoing signal path to another neighboring transceiver. The transceiver comprises an amplifier for amplifying the signals to be passed on. The transceiver is also coupled to a local power supply. The communication network is arranged for supplying remote supply power via the incoming signal path to the transceiver. The transceiver further comprises a coupling device which under normal circumstances is arranged for supplying local supply power from the local power supply to the amplifier and, when the local power supply fails, is arranged for supplying the remote supply power to the amplifier. As a result, the communication between the two neighboring transceivers is not deteriorated by a failure of the local power supply of the transceiver.

7 Claims, 4 Drawing Sheets

COMMUNICATION NETWORK

BACKGROUND OF THE INVENTION

1. Field of the Invention

The invention relates to a communication network comprising a transceiver arranged for passing on signals, coming in via an incoming signal path, to an outgoing signal path, the transceiver comprising an amplifier for amplifying the signals to be passed on and the transceiver further being coupled to a local power supply.

2. Discussion of the Related Art

Communication network, for example, a Local Area Network, having a ring topology is known from the German patent application P4306186.9. In normal operation all signals received from a first neighbouring transceiver in the ring via the incoming signal path are treated by a switching part of the transceiver. This switching part decides if the signal is to be supplied to a station coupled to the transceiver or if the signal is to be sent via the outgoing signal path to a second neighbouring transceiver in the ring. If the latter is the case, the transceiver transmits the signal to the second neighbouring transceiver after having amplified it. A well known way to avoid blocking of the transport of signals between the first and the second neighbouring transceiver, when the local power supply of the intermediate transceiver fails, is the inclusion of a relay between the incoming signal path and the outgoing signal path. The relay is open when the local power supply functions properly but is closed as soon as the local power supply fails. In this way the signal transport between the first and the second neighbouring transceiver continues, even when the local power supply of the intermediate transceiver fails. A disadvantage of this known communication network is that the relay, especially when high frequency signals are used, is a very expensive component. Furthermore, it is impossible to have a large distance between the two neighbouring transceivers, because when the local power supply of the intermediate transceiver fails, the signals coming from the first neighbouring transceiver do not reach the second neighbouring transceiver, as a result of too much attenuation.

SUMMARY OF THE INVENTION

It is therefore an object of the invention to provide a communication network, in which the transceiver does not comprise a relay and in which the distances between the first neighbouring transceiver and the transceiver as well as the distance between the transceiver and the second neighbouring transceiver can be made larger than in the cited communication network.

A communication network according to the present invention is characterized in that the communication network is arranged for supplying remote supply power via the incoming signal path to a transceiver. The transceiver comprises a coupling means which, under normal circumstances is arranged for supplying local supply power from the local power supply to the amplifier and, when the local power supply fails, is arranged for supplying the remote supply power to the amplifier. Therefore, even when the local power supply fails, the amplifier is able to amplify the signals to be passed on. Due to this amplification, the signals to be transported between the first and the second neighbouring transceiver reach the second neighbouring transceiver, even when the distance between the respective transceivers is large.

An embodiment of a communication network according to the invention is characterized in that the coupling means comprise a junction of a DC-current path of the local supply power and a DC-current path of the remote supply power, whereby respective diodes are arranged in the DC-current path of the remote supply power and in the DC-current path of the local supply power. The value of the DC-voltage of the supply power present on the junction is equal to the DC-voltage value of the remote supply power or the DC-voltage of the local supply power, whichever is higher, minus the diode voltage drop. Thus, when the local power supply fails, the remote supply power is automatically present on the junction.

A further embodiment of a communication network according to the invention is characterized in that the transceiver comprises means for supplying supply power present on the junction to the outgoing signal path. In this way also the second neighbouring transceiver, which under normal circumstances also is coupled to a local power supply, can use remote supply power when its local power supply fails.

A further embodiment of a communication network according to the invention is characterized in that further circuitry of the transceiver is directly fed by the local power supply. This means that when the local power supply fails, only the amplifier is fed by the remote supply power. This avoids large DC-currents on the incoming signal path, which would be present if the remote supply power were used for feeding a large amount of circuits.

BRIEF DESCRIPTION OF THE DRAWINGS

The invention is further explained with reference to a drawing in which.

DETAILED DESCRIPTION OF THE PREFERRED EMBODIMENTS

Figure 1:
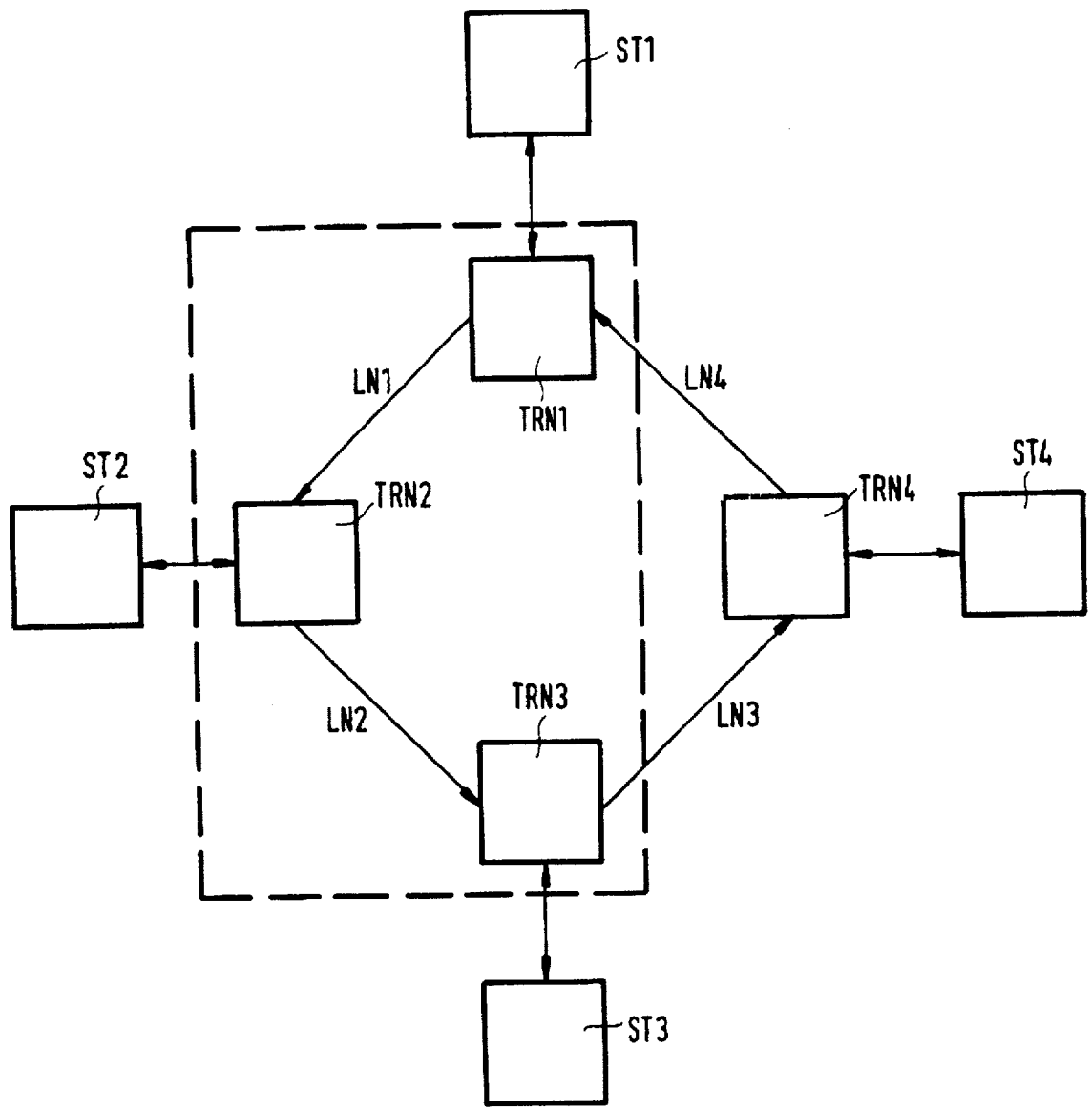
FIG. 1 shows a communication network having a ring topology.

FIG. 1 shows a communication network having transceivers TRN1,TRN2,TRN3,TRN4 arranged in a ring topology. The transceivers are coupled by signal paths LN1,LN2,LN3, LN4. Those paths can be formed by wires. The transceiver are coupled to stations ST1,ST2,ST3,ST4, respectively. A transceiver makes the decision, for example on the basis of cell header information when use is made of data cells, if a signal coming from a neighbouring transceiver is to be supplied to the station belonging to the transceiver or if it is to be transmitted to the next transceiver in the ring. The transceiver also sends signals coming from its station to the next transceiver. Thus, in the communication network of FIG. 1 a signal is being sent over the ring until it reaches its destination transceiver, which takes the signal from the ring and supplies it to the station coupled to the destination transceiver. In this network, the switching function is distributed over all the transceivers.

Figure 2:
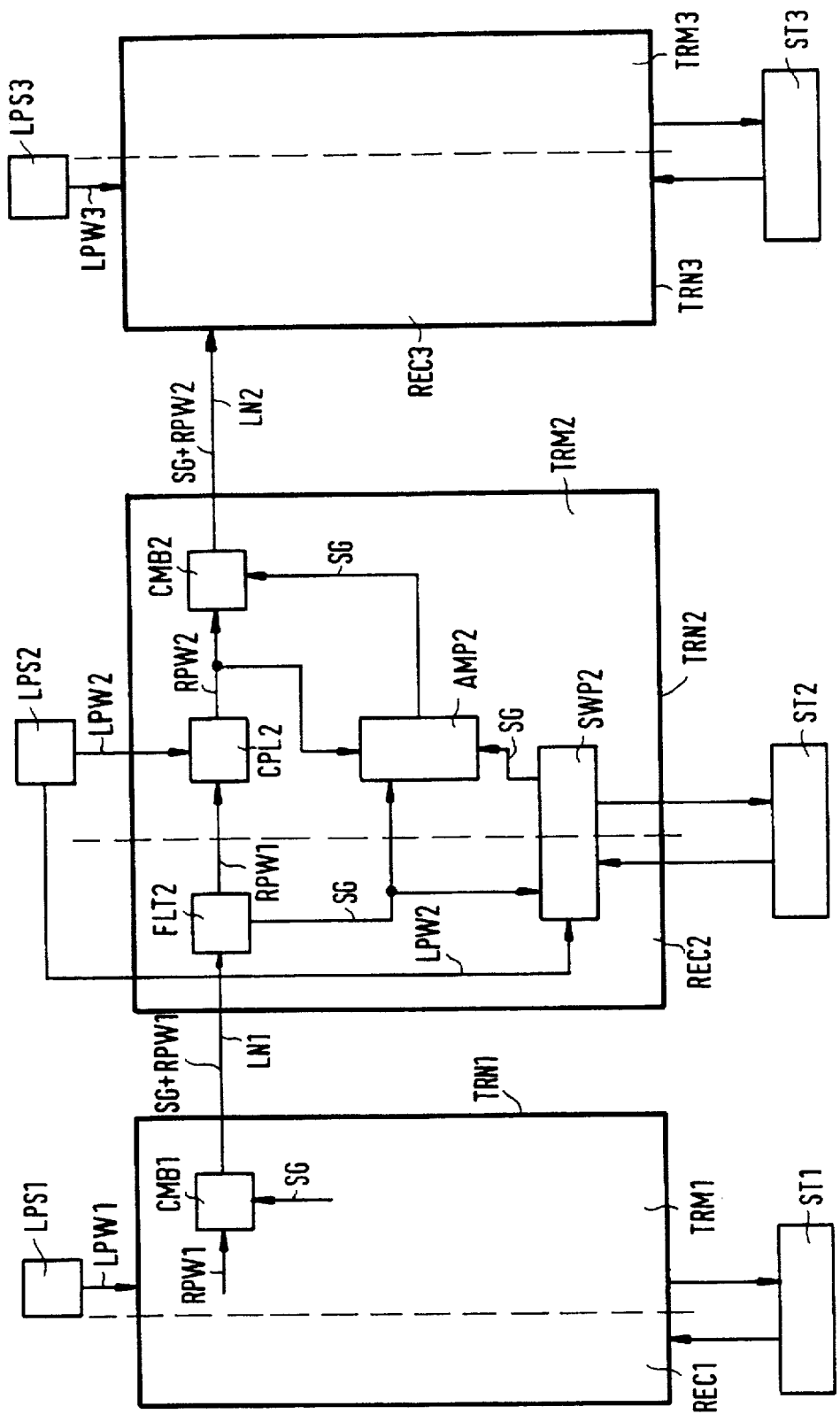
FIG. 2 shows a part of the communication network according to the invention.

FIG. 2 shows the part of FIG. 1, which is surrounded by a dashed line. This figure shows three transceivers TRN1, TRN2,TRN3, which are of the same configurations. The transceivers all consist of a transmitter part TRM1,TRM2, TRM3, further referred to as transmitter and a receiving part REC1,REC2,REC3, further referred to as receiver. The transceiver are fed by local supply power LPW1,LPW2, LPW3 supplied by respective local power supplies LPS1, LPS2,LPS3. The transceiver TRN2 is coupled to its first neighbouring transceiver TRN1 via the incoming signal path LN1 and is coupled to its second neighbouring transceiver TRN3 via an outgoing signal path LN2.

Since the transceivers are of the same configuration only one transceiver TRN2 is shown completely. Of the other two transceivers only the parts necessary to understand the invention are shown.

The transmitter TRM1 of transceiver TRN1 comprises combination means CMB1 to join signals SG to be transmitted and a supply power RPW1 and send them to signal path LN1. The transceiver TRN2 comprises a filter FLT2 for splitting the remote supply power RPW1 and the signals SG received from transceiver TRN1, a switching part SWP2 for switching the received signals to the station ST2, which is coupled to the transceiver TRN2 or switching it to the outgoing signal path LN2, an amplifier AMP2 for amplifying the signals to be passed on to signal path LN2, coupling means CPL2 for producing a resulting supply power RPW2, which under normal circumstances consists of local supply power LPW2 but if the local power supply LPS2 fails, consists of the remote supply power RPW1, and combination means CMB2 for joining the resulting supply power RPW2 and the signals SG to be transmitted and sending them to the outgoing signal path LN2. Only the amplifier is fed by the resulting supply power RPW2, the rest of the circuitry of transceiver TRN2 is fed by the local power supply LPS2. Consequently, when the local power supply fails and the resulting supply power consists of the remote supply power RPW1, the DC-current present on path LN1 remains small, while it could become very large if the resulting supply power were used for feeding a large amount of circuits.

Under normal circumstances the signals SG received from transceiver TRN1 are supplied to the switching part SWP2. This part switches the signals either to the station ST2, which is coupled to the transceiver or to the outgoing signal path LN2. Before being passed on to the outgoing signal path LN2 the signals are amplified by the amplifier AMP2.

When the local power supply LPS2 of the second transceiver fails, the switching part of the transceiver does not function any more. So, no signals can be sent to or received from the station to which the transceiver is coupled. The amplifier, being fed by the combined supply power amplifies all the received signals, which further are sent to the neighbouring transceiver TRN3. This means that the traffic of signals on the ring continues normally. Even when the distance between transceiver TRN1 and transceiver TRN3 is large the signals reach the transceiver TRN3 properly.

Figure 3A:
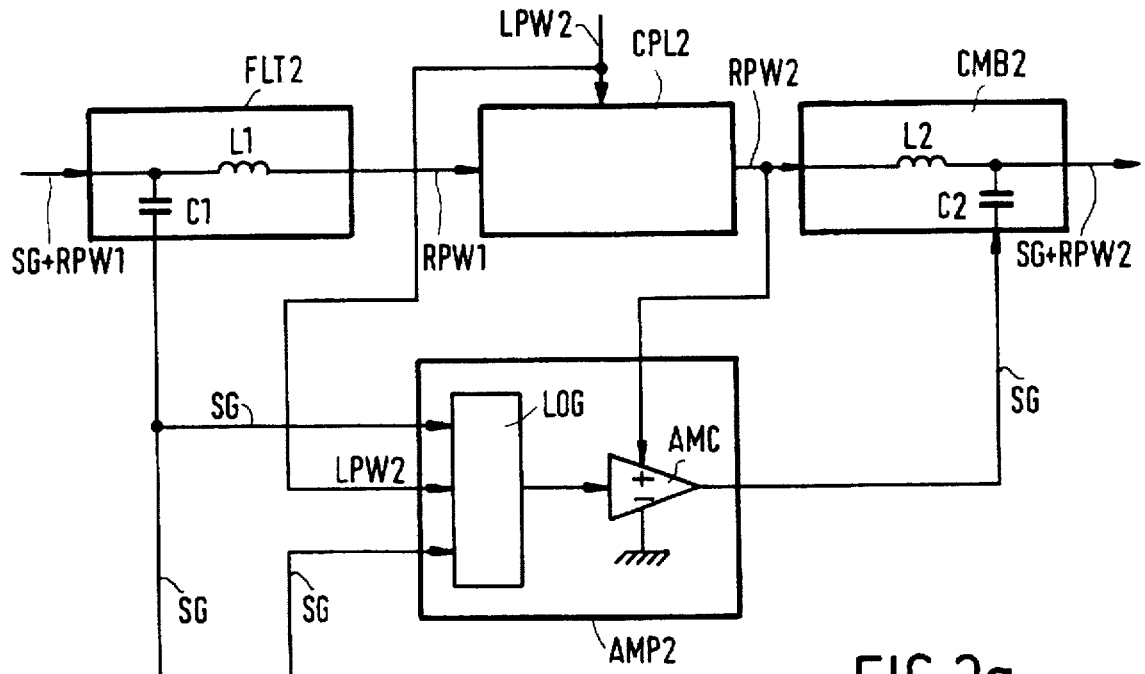
FIG. 3a shows some components of the network of FIG. 2 in more detail.

In FIG. 3a a part of FIG. 2 is shown in more detail. The filter FLT2 is formed of an inductor L1 and a capacitor C1. The value of the inductor should be chosen such that it behaves as a very large impedance for the signals. The combination means CMB2 consist of an inductor L2 and a capacitor C2. Again the value of the inductor should be chosen such that it behaves as a very large impedance for the signals. The amplifier AMP2 comprises a logic circuit LOG and an amplifying circuit AMC. Under normal circumstances, when the local power supply of the transceiver is functioning properly the signals coming from the switching part are passed on by the logic circuit to the amplifying circuit AMC. When the local supply power LPW2 is not present any more, only signals coming directly from the filter FLT2 are passed on to the amplifying circuit.

Figure 3B:
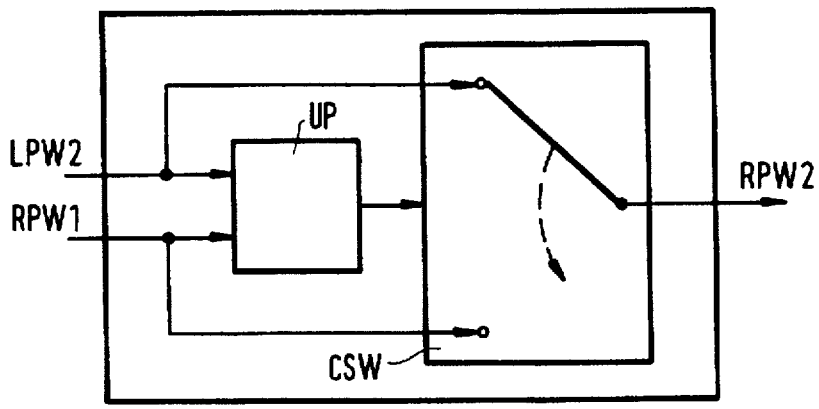
FIG. 3b shows a first way of realizing the coupling means.

FIG. 3b shows a first way of realizing the coupling means CPL2. The coupling means comprise a microprocessor UP arranged for controlling a controlled switch CSW. The microprocessor compares the DC-voltage values of the local supply power LPW2 and the remote supply power RPW1 with each other. When the DC-voltage value of the local supply power is larger than the DC-voltage value of the remote supply power, the microprocessor sets the switch in the position as drawn in FIG. 3b. When the DC-voltage value of the local supply power is smaller than the DC-voltage value of the remote supply power, the microprocessor sets the switch in the other position. Thus, the DC-voltage value of the resulting supply power RPW2 is equal to the DC-value of the local supply power LPW2 or the remote supply power RPW1, whichever is higher.

Figure 3C:
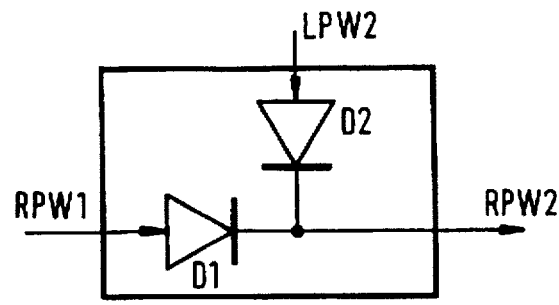
FIG. 3c shows a second way of realizing the coupling means.

FIG. 3c shows a second way of realizing the coupling means. The coupling means CPL2 consist of only two diodes D1,D2 arranged in the DC-current path of the remote supply power and in the DC-current path of the local supply power, respectively, in order to prevent DC-currents from going in an undesired direction. The value of the DC-voltage of the combined supply power is equal to the DC-voltage value of the supply power supplied by the neighbouring transceiver or the DC-voltage of the local supply power, whichever is higher, minus the diode voltage drop.

Figure 4:
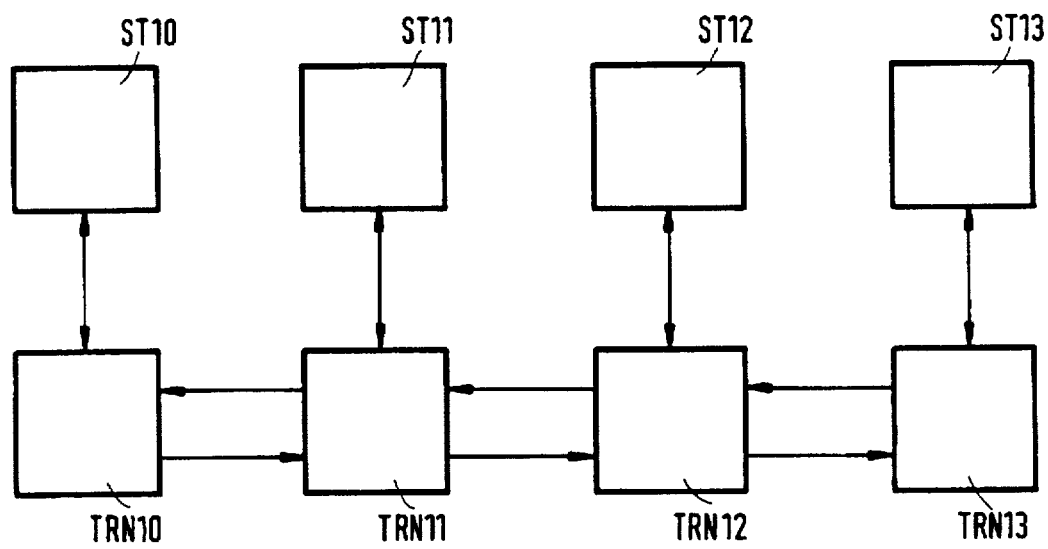
FIG. 4 shows a communication network having a chain topology.

The invention is not restricted to communication networks having a ring topology. It is usable in every communication network in which signals have to pass an intermediate transceiver in order to reach their destination. An example of such a network is given in FIG. 4. The network consists of transceivers TRN10,TRN11,TRN12,TRN13 coupled to stations ST10,ST11,ST12 and ST13, respectively. The transceivers are arranged in a so called chain topology.

We claim:

1. A communication network comprising a transceiver arranged for passing on signals input thereto, coming in via an incoming signal path, to an outgoing signal path, said transceiver comprising an amplifier for amplifying the signals to be passed on, said transceiver further being coupled to a local power supply, wherein said, communication network is arranged for supplying a remote supply power via the incoming signal path to said transceiver and wherein said transceiver further comprises coupling means which (i) under normal circumstances, is arranged for supplying local supply power from the local power supply to said amplifier and, (ii) when the local power supply fails, is arranged for supplying the remote supply power to said amplifier.

2. The communication network according to claim 1, wherein said coupling means comprise a junction of a DC-current path of the local supply power and a DC-current path of the remote supply power, and respective diodes arranged in the DC-current path of the remote supply power and in the DC-current path of the local supply power.

3. The communication network according to claim 2, wherein said transceiver further comprises means for supplying a supply power present on the junction to the outgoing signal path.

4. The communication network according to claim 3, wherein said transceiver comprises further circuitry, and said further circuitry of said transceiver is directly fed by the local power supply.

5. The communication network according to claim 2, wherein said transceiver comprises further circuitry, and said further circuitry of said transceiver is directly fed by the local power supply.

6. The communication network according to claim 1, wherein said transceiver comprises further circuitry, and said further circuitry of said transceiver is directly fed by the local power supply.

7. A transceiver arranged for passing on signals input thereto, coming in via an incoming signal terminal, to an outgoing signal terminal, said transceiver comprising:

an amplifier for amplifying the signals to be passed on; and a terminal for receiving a supply power from a local power supply, wherein said transceiver is arranged for receiving a remote supply power via the incoming signal terminal and wherein said transceiver further comprises coupling means which (i) under normal circumstances, is arranged for supplying a local supply power from the local power supply to said amplifier and, (ii) when the local power supply fails, is arranged for supplying the remote supply power to said amplifier.

* * * * *